United States Patent
Matono (10) Patent No.: US 7,576,950 B2
(45) Date of Patent: Aug. 18, 2009

(54) PERPENDICULAR MAGNETIC RECORDING HEAD UTILIZING TENSILE STRESS TO OPTIMIZE MAGNETIC POLE LAYER DOMAIN STRUCTURE

(75) Inventor: Naoto Matono, Saku (JP)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 517 days.

(21) Appl. No.: 11/187,017

(22) Filed: Jul. 22, 2005

(65) Prior Publication Data

US 2006/0028763 A1 Feb. 9, 2006

(30) Foreign Application Priority Data

Aug. 6, 2004 (JP) ............... 2004-231312

(51) Int. Cl.
G11B 5/31 (2006.01)
G11B 5/23 (2006.01)
G11B 5/39 (2006.01)
(52) U.S. Cl. ............... 360/119.02; 360/125.03; 360/317
(58) Field of Classification Search ........... 360/119.01, 360/119.02, 119.04, 125.01, 125.02, 125.03, 360/125.71, 317
See application file for complete search history.

(56) References Cited

U.S. PATENT DOCUMENTS 5,436,781 A * 7/1995 Matono et al. ......... 360/125.63

6,342,311 B1 * 1/2002 Inturi et al. ............... 360/128

FOREIGN PATENT DOCUMENTS

| JP | A 61-192011 | 8/1986 |
| JP | A 02-252111 | 10/1990 |
| JP | A-04-168615 | 6/1992 |
| JP | 05036026 A * | 2/1993 |
| JP | A 07-014120 | 1/1995 |
| JP | A 07-307009 | 11/1995 |
| JP | 10334412 A * | 12/1998 |
| JP | A 2000-150233 | 5/2000 |
| JP | A 2000-235911 | 8/2000 |
| JP | A 2000-331310 | 11/2000 |
| JP | A-2002-170209 | 6/2002 |
| JP | A-2004-185742 | 7/2004 |

OTHER PUBLICATIONS

Translation of JP 05-036026 published Feb. 12, 1993 to Uehara titled "Thin Film Magnetic Head".*

* cited by examiner

Primary Examiner—Craig A. Renner
(74) Attorney, Agent, or Firm—Oliff & Berridge, PLC (57) ABSTRACT

A thin film magnetic head is constructed so that in the case where a magnetic pole layer has a tensile stress, an insulating layer under the magnetic pole layer has a tensile stress and a gap layer on the magnetic pole layer similarly has a tensile stress. The tensile stress in the magnetic pole layer is maintained by the mechanical influence of the tensile stresses in the insulating layer and the gap layer. Consequently, the magnetic domain structure of the magnetic pole layer is optimized so as to suppress leakage of a magnetic flux remained in the magnetic pole layer to the outside at the non-recording time due to the influence of a magnetoelastic effect immediately after recording. Thus, unintended erasure of information recorded on a recording medium is suppressed.

4 Claims, 8 Drawing Sheets

RELATED ART

PERPENDICULAR MAGNETIC RECORDING HEAD UTILIZING TENSILE STRESS TO OPTIMIZE MAGNETIC POLE LAYER DOMAIN STRUCTURE

BACKGROUND OF THE INVENTION

1. Field of the Invention

The present invention relates to a thin film magnetic head having at least an inductive magnetic transducer for recording, a method of manufacturing the same, and a magnetic recording apparatus in which a thin film magnetic head is mounted.

2. Description of the Related Art

In recent years, in association with improvement in areal density of a magnetic recording medium (hereinbelow, simply called "recording medium") such as a hard disk, improvement in performance of a thin film magnetic head to be mounted on a magnetic recording apparatus such as a hard disk drive (HDD) is demanded. Known recording methods of a thin film magnetic head are a longitudinal recording method in which the orientation of a signal magnetic field is set to an in-plane direction (longitudinal direction) of a recording medium and a perpendicular recording method in which the orientation of a signal magnetic field is set to a direction orthogonal to the surface of a recording medium. At present, the longitudinal recording method is widely used. However, when a market trend accompanying improvement in areal density of a recording medium is considered, it is assumed that, in place of the longitudinal recording method, the perpendicular recording method will be regarded as a promising method in future for the following reason. The perpendicular recording method has advantages such that high linear recording density can be assured and a recorded recording medium is not easily influenced by thermal decay.

A thin film magnetic head of the perpendicular recording method has, mainly, a thin film coil for generating a magnetic flux and a magnetic pole layer for emitting the magnetic flux generated by the thin film coil toward a recording medium. In the thin film magnetic head of the perpendicular recording method, when current is passed to the thin film coil and a magnetic flux for recording is generated, a magnetic flux is emitted from the tip of the magnetic pole layer, and a magnetic field for recording (perpendicular magnetic field) is generated. Consequently, the surface of the recording medium is magnetized on the basis of the perpendicular magnetic field. In such a manner, information is magnetically recorded on the recording medium.

Improvement in the performance of the thin film magnetic head is in increasing demand. Considering such a technical background, recently, as a measure capable of improving the performance of the thin film magnetic head, for example, in addition to the change of the recording method from the longitudinal recording method to the perpendicular recording method, attempt to optimize the magnetic domain structure of a magnetic component of the main part of the thin film magnetic head is being examined.

Concretely, for example, a magnetic film having a magnetic layer made of a magnetic metal and a transition metal and an intermediate layer similarly made of a magnetic metal and a transition metal and optimized so that the composition of each of the magnetic layer and the intermediate layer can assure a high frequency characteristic, strong uniaxial anisotropy, and high saturated magnetic flux density is known (refer to, for example, Japanese Unexamined Patent Application (JP-A) No. 2000-150233). There is another known magnetic material containing nickel (Ni), iron (Fe), and molybdenum (Mo) and whose composition and magnetostriction constant are optimized so that a high frequency characteristic and an excellent magnetic domain structure can be assured (refer to, for example, JP-A No. 2000-235911).

Examples of known thin film magnetic heads include: a thin film magnetic head having a top magnetic pole in which magnetostriction constants in upper and lower regions are opposite to each other so that uniaxial anisotropy can be assured in an arbitrary direction (refer to, for example, JP-A Nos. H07-307009 and S61-192011); a thin film magnetic head having a yoke including two sets of magnetic layers having magnetostriction constants different from each other and disposed so as to partially overlap each other so that occurrence of noise due to a stress-induced anisotropy effect can be suppressed (refer to, for example, JP-A No. H07-014120); and a thin film magnetic head including a pole chip having zero or negative magnetostriction constant and a head core rear part having zero or positive magnetostriction constant so as to be able to suppress distorsion of a reproduced waveform (refer to, for example, JP-A No. H02-252111).

Further another example is a thin film magnetic head having a magnetic domain control soft magnetic layer for making a 180° magnetic wall in the core width direction appear in a magnetic domain structure of a yoke between a coil covering layer which covers a coil layer and the yoke in a magnetic pole layer so that an excellent magnetic domain structure, a high frequency response characteristic, and a high transfer rate can be assured (refer to, for example, JP-A No. 2000-331310).

In order to assure the operation characteristics of the thin film magnetic head of the perpendicular recording method, it is necessary to optimize the magnetic domain structure of the magnetic pole layer also from this viewpoint of suppressing unintended erasure of information at the non-recording time. The "unintended erasure of information at the non-recording time" is a trouble in the recording characteristic such that information recorded on a recording medium is erased unintentionally by leakage of a magnetic flux (remanent magnetization) remaining in the magnetic pole layer due to the magnetic domain structure of the magnetic pole layer as a part for emitting a magnetic flux for recording at the non-recording time, that is, in a state where the thin film coil is not energized (no magnetic flux for recording is generated). Although it is known that the composition of the magnetic material and magnetostriction of a magnetic component exert an influence on the magnetic domain structure of the magnetic pole layer, sufficient knowledge regarding the relation between an unintended information erasure occurrence mechanism at the time of non-recording time and the magnetic domain structure of the magnetic pole layer is not obtained conventionally. It is consequently an issue how to set the magnetic domain structure of the magnetic pole layer in order to suppress unintended erasure of information at the non-recording time. Therefore, to assure the operation characteristics of the thin film magnetic head of the perpendicular recording method, establishment of a technique capable of suppressing unintended erasure of information at the non-recording time is demanded.

SUMMARY OF THE INVENTION

The present invention has been achieved in consideration of such problems and its first object is to provide a thin film magnetic head capable of suppressing unintended erasure of information at the non-recording time by optimizing a magnetic domain structure of a magnetic pole layer.

A second object of the invention is to provide a magnetic recording apparatus on which a thin film magnetic head is mounted and capable of suppressing unintended erasure of information at the non-recording time.

A thin film magnetic head according to the invention includes: a thin film coil for generating a magnetic flux; a magnetic pole layer extending rearward from a recording-medium-facing surface which faces a recording medium traveling in a medium travel direction, emitting the magnetic flux generated by the thin film coil toward the recording medium, and having a tensile stress in the whole; and a nonmagnetic layer which buries the magnetic pole layer, thereby magnetically isolating the magnetic pole layer from the periphery, and having a tensile stress at least in part of it.

A method of manufacturing a thin film magnetic head including: a thin film coil for generating a magnetic flux; a magnetic pole layer extending rearward from a recording-medium-facing surface which faces a recording medium traveling in a medium travel direction and emitting the magnetic flux generated by the thin film coil toward the recording medium; and a nonmagnetic layer which buries the magnetic pole layer, thereby magnetically isolating the magnetic pole layer from the periphery, the method according to the invention includes: a first step of forming the magnetic pole layer so as to have a tensile stress in the whole; and a second step of forming the nonmagnetic layer so as to have a tensile stress at least in part of it.

In the thin film magnetic head or the method of manufacturing the same according to the invention, in the case where a magnetic pole layer has a tensile stress in the whole, at least part of the nonmagnetic layer burying the magnetic pole layer similarly has a tensile stress. Therefore, the tensile stress in the magnetic pole layer is maintained by the mechanical influence of the tensile stress in the nonmagnetic layer. Consequently, the magnetic domain structure of the magnetic pole layer is optimized so as to suppress leakage of a magnetic flux remained in the magnetic pole layer to the outside at the non-recording time due to the influence of a magnetoelastic effect immediately after recording.

A magnetic recording apparatus according to the invention is a magnetic recording apparatus on which a recording medium and a thin film magnetic head for performing a magnetic process on the recording medium are mounted. The thin film magnetic head includes: a thin film coil for generating a magnetic flux; a magnetic pole layer extending rearward from a recording-medium-facing surface which faces a recording medium traveling in a medium travel direction, emitting the magnetic flux generated by the thin film coil toward the recording medium, and having a tensile stress in the whole; and a nonmagnetic layer which buries the magnetic pole layer, thereby magnetically isolating the magnetic pole layer from the periphery, and having a tensile stress at least in part of it.

Since the thin film magnetic head is mounted on the magnetic recording apparatus according to the invention, the magnetic domain structure of the magnetic pole layer in the thin film magnetic head is optimized.

In the thin film magnetic head according to the invention, the magnetic pole layer specifies a recording track width of the recording medium, and the nonmagnetic layer may include a first nonmagnetic layer part which is adjacent to the magnetic pole layer in a first direction in the medium travel direction, a second nonmagnetic layer part which is adjacent to the magnetic pole layer in a second direction opposite to the first direction, a third nonmagnetic layer part adjacent to the magnetic pole layer in a third direction in the recording track width direction, and a fourth nonmagnetic layer part adjacent to the magnetic pole layer in a fourth direction opposite to the third direction. In this case, only the first and second nonmagnetic layer parts may have a tensile stress, only the third and fourth nonmagnetic layer parts may have a tensile stress, or all of the first, second, third, and fourth nonmagnetic layer parts may have a tensile stress. In particular, preferably, at least part having a tensile stress of the nonmagnetic layer is made of a material which has a compressive stress when formed by using sputtering, and which has a tensile stress when formed by using CVD (Chemical Vapor Deposition). The material is concretely aluminum oxide (AlOx) or aluminum nitride (AlN). It is also preferable that the magnetic pole layer be constructed by containing a material having a positive magnetostriction coefficient, concretely, an alloy containing iron (Fe) and cobalt (Co). The magnetic pole layer may be constructed so as to emit a magnetic flux for magnetizing the recording medium in a direction orthogonal to the surface of the recording medium.

In the method of manufacturing a thin film magnetic head according to the invention, a recording track width of the recording medium is specified by the magnetic pole layer and, in the second step, the nonmagnetic layer may be formed so as to include a first nonmagnetic layer part which is adjacent to the magnetic pole layer in a first direction in the medium travel direction, a second nonmagnetic layer part which is adjacent to the magnetic pole layer in a second direction opposite to the first direction, a third nonmagnetic layer part adjacent to the magnetic pole layer in a third direction in the recording track width direction, and a fourth nonmagnetic layer part adjacent to the magnetic pole layer in a fourth direction opposite to the third direction. In this case, in the second step, the nonmagnetic layer may be formed so that only the first and second nonmagnetic layer parts have a tensile stress, the nonmagnetic layer may be formed so that only the third and fourth nonmagnetic layer parts have a tensile stress, or the nonmagnetic layer may be formed so that all of the first, second, third, and fourth nonmagnetic layer parts have a tensile stress. In particular, preferably, in the second step, at least part having a tensile stress of the nonmagnetic layer is formed by using CVD (Chemical Vapor Deposition) so as to contain a material which has a compressive stress when formed by using sputtering, and which has a tensile stress when formed by using CVD. The material is, concretely, aluminum oxide (AlOx) or aluminum nitride (AlN). In the first step, it is also preferable to form the magnetic pole layer so as to contain a material having a positive magnetostriction coefficient, concretely, an alloy containing iron (Fe) and cobalt (Co).

In the thin film magnetic head or the method of manufacturing the same according to the invention, in the case where a magnetic pole layer has a tensile stress in the whole, based on the fact that at least part of the nonmagnetic layer burying the magnetic pole layer similarly has a tensile stress, the magnetic domain structure of the magnetic pole layer is optimized so as to suppress leakage of a magnetic flux remained in the magnetic pole layer to the outside at the non-recording time due to the influence of a magnetoelastic effect immediately after recording. Thus, unintended erasure of information recorded on a recording medium is suppressed. Therefore, by optimizing the magnetic domain structure of the magnetic pole layer, unintended erasure of information at the non-recording time can be suppressed.

In the magnetic recording apparatus according to the invention, since the thin film magnetic head is mounted, the magnetic domain structure of the magnetic pole layer in the thin film magnetic head is optimized. Therefore, the thin film magnetic head can be mounted while suppressing unintended erasure of information at the non-recording time.

Other and further objects, features and advantages of the invention will appear more fully from the following description.

DETAILED DESCRIPTION OF THE PRFERRED EMBODIMENTS

Embodiments of the invention will now be described in detail hereinbelow with reference to the drawings.

Figure 1A:
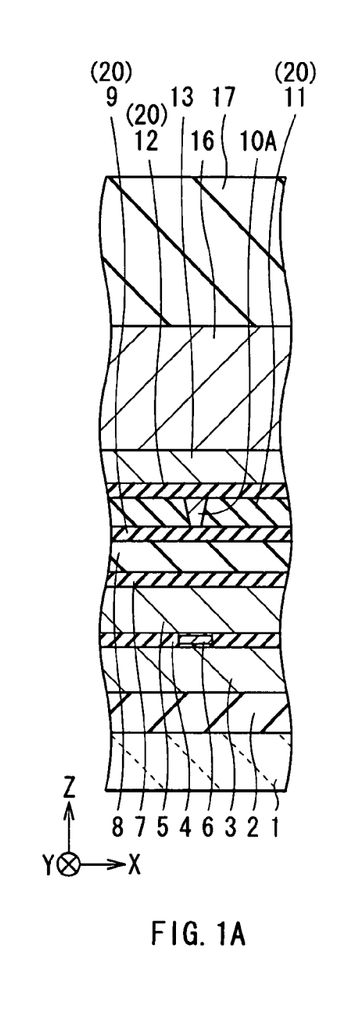
FIGS. 1A and 1B are cross sections showing a sectional configuration of a thin film magnetic head according to an embodiment of the invention.
Figure 1B:
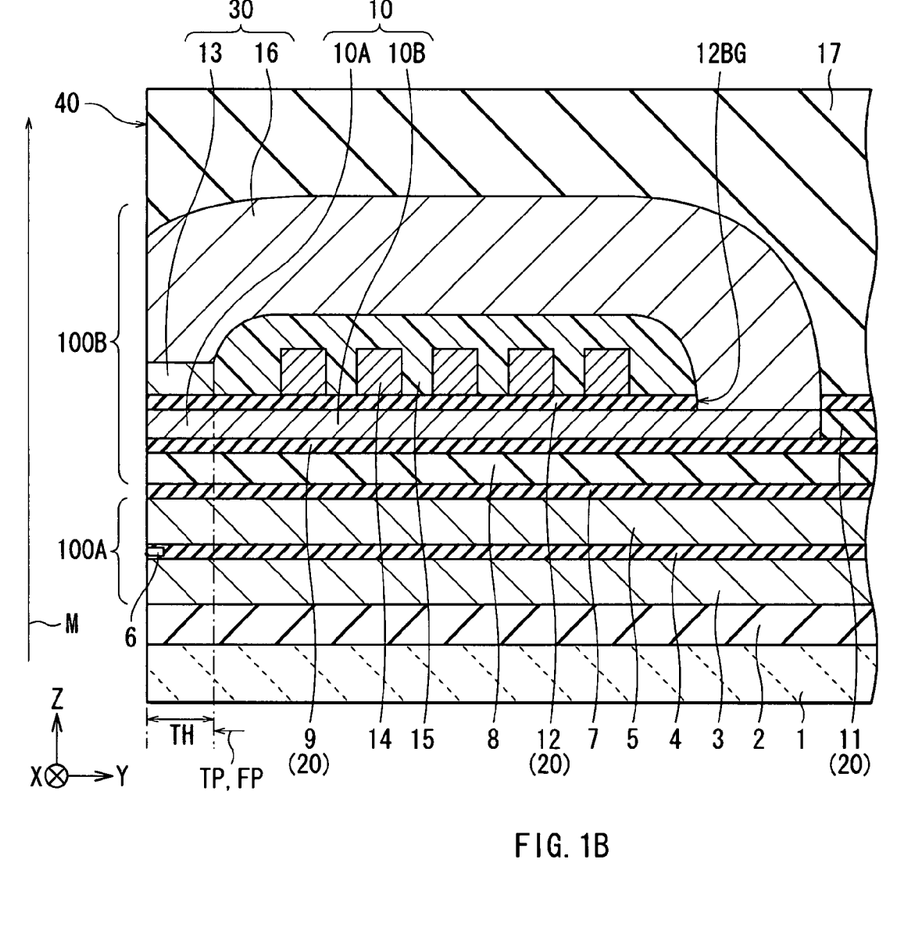
Figure 2:
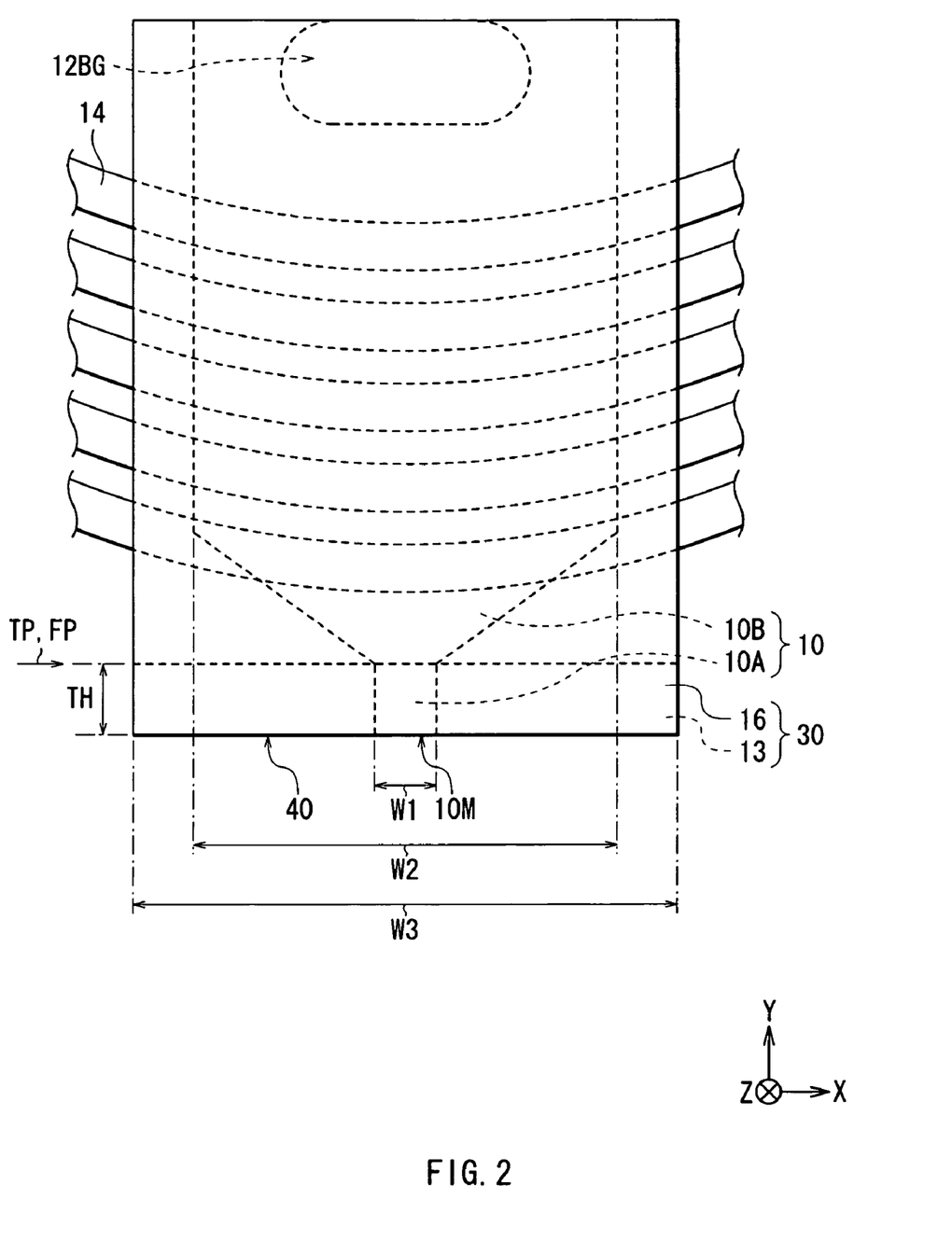
FIG. 2 is a plan view showing the configuration of the thin film magnetic head illustrated in FIGS. 1A and 1B.

First, the configuration of a thin film magnetic head according to an embodiment of the invention will be described with reference to FIGS. 1A and 1B and FIG. 2. FIGS. 1A and 1B show sectional configurations of a thin film magnetic head. FIG. 1A shows a sectional configuration parallel to an air bearing surface (a sectional configuration along an XZ plane) and FIG. 1B shows a section configuration perpendicular to the air bearing surface (a sectional configuration along a YZ plane). FIG. 2 is a plan view showing the configuration (plane configuration seen from the Z-axis direction) of the thin film magnetic head illustrated in FIGS. 1A and 1B. An upward arrow M shown in FIGS. 1A and 1B indicates the travel direction of a recording medium (not shown) relative to the thin film magnetic head (medium travel direction M).

In the following description, the distance in the X-axis direction shown in FIGS. 1A and 1B and FIG. 2 will be described as "width", the distance in the Y-axis direction will be described as "length", and the distance in the Z-axis direction will be described as "thickness". The side closer to the air bearing surface in the Y-axis direction will be described as "front side or forward" and the side opposite to the front side will be described as "rear side or rearward". The description will be similarly used in FIG. 3 and subsequent drawings.

The thin film magnetic head according to the embodiment is to be mounted on a magnetic recording apparatus such as a hard disk drive (HDD) in order to perform a magnetic process on a magnetic recording medium (hereinbelow, simply called "recording medium") such as a hard disk traveling in the medium travel direction M. The thin film magnetic head is, for example, a composite head capable of executing both of a recording process and a reproducing process as magnetic processes. As shown in FIGS. 1A and 1B, the thin film magnetic head has a configuration obtained by sequentially stacking, on a substrate 1 made of a ceramic material such as AlTiC ($Al_2O_3 \cdot TiC$), an insulating layer 2 made of a nonmagnetic insulating material such as aluminum oxide ($Al_2O_3$, hereinbelow, simply called "alumina"), a reproducing head portion 100A for executing a reproducing process by using a magneto-resistive (MR) effect, an isolation layer 7 made of a nonmagnetic insulating material such as alumina, a recording head portion 100B of a shield type for executing a recording process of a perpendicular recording method, and an overcoat layer 17 made of a nonmagnetic insulating material such as alumina.

The reproducing head portion 100A has, for example, a configuration in which a lower read shield layer 3, a shield gap film 4, and an upper read shield layer 5 are stacked in this order. In the shield gap film 4, an MR device 6 as a reproducing device is buried so that one end face is exposed in a recording-medium-facing surface (air bearing surface) 40 which faces a recording medium.

The lower and upper read shield layers 3 and 5 are provided to magnetically isolate the MR device 6 from the periphery and extend rearward from the air bearing surface 40. The lower and upper read shield layers 3 and 5 are made of a magnetic material such as a nickel iron alloy (NiFe (for example, Ni: 80% by weight and Fe: 20% by weight) which will be simply called "permalloy (trademark)" hereinbelow). Each of the layers has a thickness of about 1.0 μm to 2.0 μm.

The shield gap film 4 is used to electrically isolate the MR device 6 from the periphery and is made of, for example, a nonmagnetic insulating material such as alumina.

The MR device 6 is provided to execute a magnetic process (reproducing process) by using GMR (Giant Magneto-Resistive) effect or TMR (Tunneling Magneto-Resistive) effect.

The recording head portion 100B has a configuration in which an insulating layer 8, a magnetic pole layer 10 whose periphery is buried by a nonmagnetic layer 20, a thin film coil 14 buried by an insulating layer 15, and a write shield layer 30 are stacked in this order.

The insulating layer 8 is provided to electrically isolate the recording head portion 100B from the reproducing head portion 100A. The insulating layer 8 is made of, for example, a nonmagnetic insulating material such as alumina and has a thickness of about 0.2 μm to 4.0 μm.

The nonmagnetic layer 20 buries the magnetic pole layer 10 so as to magnetically isolate it from the periphery and includes, for example, an insulating layer 9 disposed on the insulating layer 8, a gap layer 12 disposed on the magnetic pole layer 10, and an insulating layer 11 disposed so as to bury the periphery of the magnetic pole layer 10 between the insulating layer 9 and the gap layer 12. In particular, the nonmagnetic layer 20 has, at least in part of it, a stress adjusting function. For example, the nonmagnetic layer 20 has the stress adjusting function only in the insulating layer 9 and the gap layer 12.

The insulating layer 9 has the stress adjusting function and, concretely, has the function of optimizing the stress state of the magnetic pole layer 10 and the peripheral structure. The "stress state" denotes a mechanical relation (mechanical balance) between the stress of the magnetic pole layer 10 and the stress of the peripheral structure and is a mechanical characteristic exerting an influence on the magnetic domain structure of the magnetic pole layer 10. For example, the insulating layer 9 is thinner than that the insulating layer 8 and has a thickness of about 50 nm to 200 nm. The stress adjusting function and the material of the insulating layer 9 will be described later (refer to FIGS. 3 to 5).

The magnetic pole layer 10 contains the magnetic flux generated by the thin film coil 14 and emits the magnetic flux toward a recording medium, thereby executing a magnetic process (recording process). The magnetic pole layer 10 extends rearward from the air bearing surface 40 as shown in FIGS. 1A and 1B and 2, has an exposed face 10M exposing on the air bearing surface 40, and has a thickness of about 0.2 µm to 0.3 µm. The stress state of the magnetic pole layer 10 and its peripheral structure is optimized on the basis of the stress adjusting function of the insulating layer 9 and the gap layer 12. Concretely, stress of the magnetic pole layer 10 is maintained properly. The magnetic pole layer 10 includes, for example, as shown in FIG. 2, in order from the side close to the air bearing surface 40, a front end portion 10A having a uniform width W1 (for example, W1=about 0.15 µm) specifying the recording track width of the recording medium, and a rear end portion 10B coupled to the rear end of the front end portion 10A and having a width W2 larger than the width W1 of the front end portion 10A (W2>W1). The rear end portion 10B has, for example, the width W2 which is uniform in the rear portion and is gradually tapered toward the front end portion 10A in the front portion. The "coupling" denotes not simple physical contact but a state of physical contact and magnetic conduction. The position from which the width of the main magnetic pole layer 10 increases from the front end portion 10A (width W1) to the rear end portion 10B (width W2) is a "flare point FP" as one of important factors for determining the recording characteristics of the thin film magnetic head. The material of the magnetic pole layer 10, and the detail relations between the stress adjusting function of the insulating layer 9 and the gap layer 12, and the stress of the magnetic pole layer 10 will be described later (refer to FIGS. 3 to 5).

The insulating layer 11 is made of, for example, a nonmagnetic insulating material such as alumina.

The gap layer 12 is to provide a gap (magnetic gap) for magnetically separating between the magnetic pole layer 10 and the write shield layer 30. In particular, the gap layer 12 has the function of constructing a magnetic gap and, as described have, the stress adjusting function like the insulating layer 9. The gap layer 12 is thinner than the insulating layer 8 and has a thickness of about 10 nm to 100 nm. The gap layer 12 has an opening (a back gap 12BG) for magnetic coupling. The stress adjusting function and the material of the gap layer 12 will be described later (refer to FIGS. 3 to 5).

The thin film coil 14 generates a magnetic flux for recording and is made of, for example, a high-conductive material such as copper (Cu). As shown in FIGS. 1A and 1B and FIG. 2, the thin film coil 14 has a winding structure (spiral structure) that it is wound around the back gap 12BG as a center. In FIGS. 1A and 1B and FIG. 2, only a part of a plurality of turns constructing the thin film coil 14 is shown.

The insulating layer 15 covers the thin film coil 14 so as to electrically isolate it from the periphery and is disposed on the gap layer 12 so as not to cover the back gap 12BG. The insulating layer 15 is made of, for example, a photoresist (photosensitive resin) showing liquidity when heated or a nonmagnetic insulating material such as spin on glass (SOG). The edge portion of the insulating layer 15 is a rounded inclined face. The front edge position of the insulating layer 15 is a "throat height zero position TP" as one of important factors determining the recording performance of the thin film magnetic head. The distance between the air bearing surface 40 and the throat height zero position TP is a so-called "throat height TH". FIGS. 1A and 1B and FIG. 2 shows, for example, a state where the throat height zero position TP coincides with the flare point FP.

The write shield layer 30 is provided to receive a spread component of the magnetic flux emitted from the magnetic pole layer 10 to prevent the magnetic flux from spreading. In particular, the write shield layer 30 has the function of preventing spread of the magnetic flux and also the function of collecting a magnetic flux emitted from the magnetic pole layer 10 toward a recording medium and returned from the recording medium (used for a recording process) and re-supplying it to the magnetic pole layer 10, that is, circulating the magnetic flux between the thin film magnetic head and the recording medium. The write shield layer 30 extends rearward from the air bearing surface 40 on the trailing side of the magnetic pole layer 10, is separated from the magnetic pole layer 10 by the gap layer 12 on the side close to the air bearing surface 40, and is coupled to the magnetic pole layer 10 via the back gap 12BG on the side far from the air bearing surface 40. The "trailing side" is a side of outflow of a recording medium (medium travel direction M side) when a traveling state of the recording medium traveling in the medium travel direction M shown in FIGS. 1A and 1B is regarded as a flow and is, in this case, an upper side in the thickness direction (Z-axis direction). On the other side, an inflow side (the side opposite to the medium travel direction M side) is called a "leading side" and is a downward side in the thickness direction.

Specifically, the write shield layer 30 includes two elements constructed as members different from each other, which are a TH specifying layer 13 functioning as a main magnetic flux receiving port, and a yoke layer 16 functioning as a passage of the magnetic flux received from the TH specifying layer 13. The TH specifying layer 13 extends rearward from the air bearing surface 40 to a position between the air bearing surface 40 and the back gap 12BG, concretely, a position between the air bearing surface 40 and the thin film coil 14 while being adjacent to the gap layer 12. The TH specifying layer 13 is made of, for example, a magnetic material having a high saturated magnetic flux density such as permalloy or iron-cobalt-base alloy and has, for example as shown in FIG. 2, a rectangular shape in plan view, which has a width W3 larger than the width W2 of the magnetic pole layer 10 (W3>W2). To the TH specifying layer 13, the insulating layer 15 in which the thin film coil 14 is buried is adjacent. That is, the TH specifying layer 13 plays the role of specifying the front end position (throat height zero position TP) of the insulating layer 15, concretely, specifying the throat height TH. On the other hand, the yoke layer 16 extends from the air bearing surface 40 to a position corresponding to the back gap 12BG so as to cover the insulating layer 15, lies on and is coupled to the TH specifying layer 13 in the front portion and is coupled to the magnetic pole layer 10 via the back gap 12BG in the rear portion. The yoke layer 16 is made of, for example, like the TH specifying layer 13, a magnetic material having high-saturated magnetic flux density such as permalloy or iron-cobalt-base alloy and has, as shown in FIG. 2, a rectangular shape having the width W3 in plan view.

Figure 3:
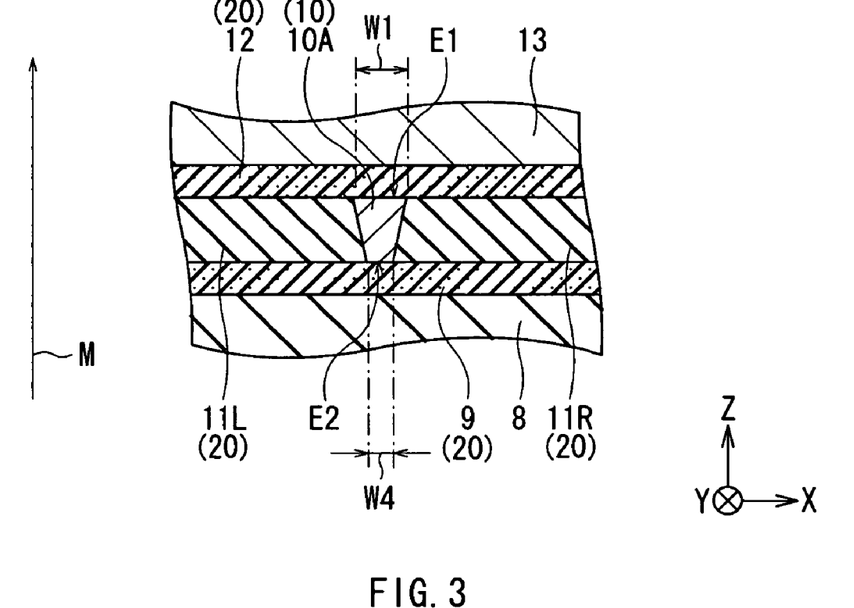
FIG. 3 is an enlarged cross section showing the configuration of a magnetic pole layer and its peripheral structure in the thin film magnetic head illustrated in FIGS. 1A and 1B.
Figure 4:
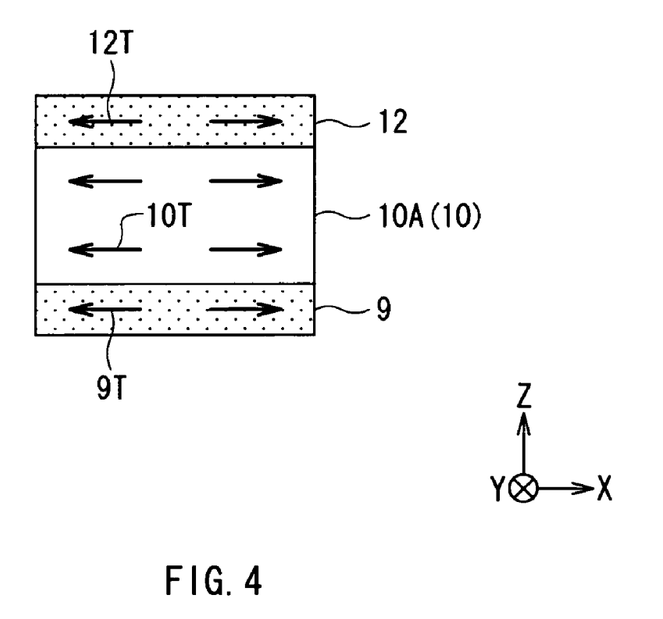
FIG. 4 is a diagram schematically showing a stress state of the magnetic pole layer and its peripheral structure illustrated in FIG. 3.
Figure 5:
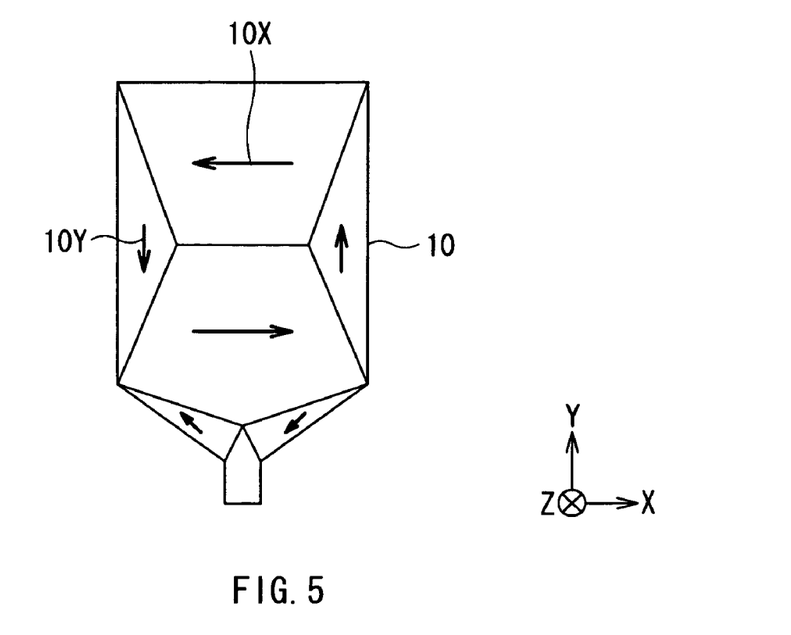
FIG. 5 is a diagram schematically showing a magnetic domain structure of the magnetic pole layer corresponding to the stress state shown in FIG. 4.

The structural characteristics of the thin film magnetic head according to the embodiment will now be described with reference to FIGS. 1A and 1B to FIG. 5. FIG. 3 shows an enlarged sectional configuration (sectional configuration in the XZ plane) of the magnetic pole layer 10 and its peripheral structure in the thin film magnetic head illustrated in FIG. 1A. FIG. 4 schematically shows a stress state of the magnetic pole layer 10 and its peripheral structure illustrated in FIG. 3. FIG. 5 schematically shows a magnetic domain structure of the magnetic pole layer 10 corresponding to the stress state shown in FIG. 4.

The magnetic pole layer 10 is constructed by containing, for example, a material having a positive magnetostriction constant, concretely, an iron-cobalt-base alloy containing iron (Fe) and cobalt (Co). The "iron-cobalt-base alloy" is, for example, a magnetic material having high-saturated magnetic flux density such as iron cobalt alloy (FeCo) or iron cobalt nickel alloy (FeCoNi). The front end portion 10A of the magnetic pole layer 10 includes, for example, as shown in FIG. 3, an upper edge E1 positioned on the trailing side and having the width W1, and a lower edge E2 positioned on the leading side and having the width W4 smaller than the width W1 (W4<W1) and has a sectional shape of an inverted trapezoid using the upper edge E1 as longer one of two opposite sides and the lower edge E2 as the shorter side. The sectional shape of the inverted trapezoid is uniform irrespective of the position in the extension direction (Y-axis direction) of the front end portion 10A. That is, the exposed face 10M (refer to FIG. 2) of the magnetic pole layer 10 also has the inverted trapezoid shape. In particular, since the magnetic pole layer 10 is constructed by containing the material having the positive magnetostriction constant as described above, the whole magnetic pole layer 10 has a tensile stress 10T as shown in FIG. 4. The "tensile stress 10T" is a stress caused due to factors such as the material, film forming conditions, and the like of the magnetic pole layer 10 and remaining in the magnetic pole layer 10. Concretely, the tensile stress 10T is a stress acting in tensile directions (directions to the outer sides) with the center position of the magnetic pole layer 10 as a reference. On the contrary, a stress acting in compressing directions (directions to the inner sides) with the center position of the magnetic pole layer 10 as a reference is called a "compressive stress".

The nonmagnetic layer 20 includes, for example, as shown in FIG. 3, when the position of the magnetic pole layer 10 is a reference, (1) the insulating layer 9 (first nonmagnetic layer portion) adjacent to the magnetic pole layer 10 on the lower side, that is, on the leading side (first direction) in the medium travel direction M (Y-axis direction), (2) the gap layer 12 (second nonmagnetic layer portion) adjacent to the magnetic pole layer 10 on the upper side, that is, the trailing side (second direction) in the medium travel direction M (Y-axis direction), (3) a part (an insulating layer 11R; third nonmagnetic layer portion) of the insulating layer 11 adjacent to the magnetic pole layer 10 on the right side (third direction) in the recording track width direction (X-axis direction), and (4) the other part (an insulating layer 11L; fourth nonmagnetic layer portion) of the insulating layer 11 adjacent to the magnetic pole layer 10 on the left side (fourth direction) in the recording track width direction (X-axis direction). The nonmagnetic layer 20 is an assembly obtained by coupling the insulating layers 9, 11R, and 11L and the gap layer 12 so as to surround the magnetic pole layer 10. In particular, the nonmagnetic layer 20 has, for example, as described above, the stress adjusting function at least in part of it, concretely, only in the insulating layer 9 and the gap layer 12. That is, as shown in FIG. 4, the insulating layer 9 under the magnetic pole layer 10 has a tensile stress 9T and the gap layer 12 on the magnetic pole layer 10 has similarly a tensile stress 12T. The insulating layer 11R on the right side of the magnetic pole layer 10 and the insulating layer 11L on the left side of the magnetic pole layer 10 have, for example, a compressive stress different from the insulating layer 9 and the gap layer 12 having the tensile stresses (9T and 12T, respectively). The insulating layer 9 and the gap layer 12 are constructed by containing a nonmagnetic insulating material which has a compressive stress when formed by using sputtering or a tensile stress when formed by CVD (Chemical Vapor Deposition). Concretely, the insulating layer 9 and the gap layer 12 are constructed by containing aluminum oxide (AlOx) or aluminum nitride (AlN). In FIGS. 3 and 4, only the insulating layer 9 and the gap layer 12 have the tensile stresses (9T and 12T) out of the insulating layers 9, 11R, and 11L and the gap layer 12 constructing the nonmagnetic layer 20. To show it clearly, the insulating layer 9 and the gap layer 12 are hatched.

As described above, in the case where the magnetic pole layer 10 has the tensile stress 10T and the insulating layer 9 and the gap layer 12 on and under the magnetic pole layer 10 have the tensile stresses 9T and 12T, respectively, for example, as shown in FIG. 5, a magnetization component 10X parallel to the direction (X-axis direction) orthogonal to the extension direction of the magnetic pole layer 10 becomes dominant over a magnetization component 10Y parallel to the extension direction (Y-axis direction) of the magnetic pole layer 10 in the magnetic domain structure in the magnetic pole layer 10. That is, when the magnetic pole layer 10 has the tensile stress 10T, by having the tensile stresses 9T and 12T, the insulating layer 9 and the gap layer 12 adjacent to the magnetic pole layer 10 have the stress adjusting function of optimizing the stress states of the magnetic pole layer 10 and the peripheral structure so that the magnetization component 10X becomes dominant over the magnetization component 10Y in the magnetic domain structure of the magnetic pole layer 10. The stresses (tensile stress and compressive stress) can be measured by using, for example, XRD (X-Ray Diffraction). The XRD is an analyzing method capable of measuring, mainly, the absolute value of a residual stress (tensile stress, compressive stress) of the thin film.

For reference sake, the materials of the insulating layer 9 and the gap layer 12 having the tensile stresses (9T and 12T) and those of the insulating layers 11R and 11L having the compressive stress are compared with each other. They are similar to each other with respect to the point that the nonmagnetic insulating material typified by aluminum oxide is included, but are different from each other with respect to the point that they have stresses different from each other due to different film forming methods. In the insulating layer 9 and the gap layer 12 formed by using the nonmagnetic insulating material by CVD, the tensile stress is dominant. In the insulating layers 11R and 11L formed by using the nonmagnetic insulating layer material by sputtering, the compressive stress is dominant. The reason why the kind of stress varies according to the film forming methods even though the common nonmagnetic insulating material is used is that, for example, in the case of using an aluminum oxide as the nonmagnetic insulating layer material, it is imagined that the mechanism of capturing an oxygen element in an aluminum skeleton at the time of forming a film varies according to the film forming methods.

The operation of the thin film magnetic head will now be described with reference to FIGS. 1A and 1B and FIG. 2.

In the thin film magnetic head, at the time of recording information, when a current flows into the thin film coil 14 of the recording head portion 100B from a not-shown external circuit, a magnetic flux is generated by the thin film coil 14. The magnetic flux generated at this time is contained by the magnetic pole layer 10 and, after that, flows from the rear end portion 10B to the front end portion 10A in the main magnetic pole layer 10. Since the magnetic flux flowing in the magnetic pole layer 10 is narrowed as the width of the magnetic pole layer 10 decreases, and is converged at the flare point FP, the magnetic flux is concentrated in the trailing side portion of the front end portion 10A. When the magnetic flux concentrated in the trailing side portion is emitted from the front end portion 10A to the outside, a recording magnetic field (perpendicular magnetic field) is generated in the direction orthogonal to the surface of a recording medium, and the recording medium is magnetized in the perpendicular direction on the basis of the perpendicular magnetic field, thereby magnetically recording information onto the recording medium. At the time of recording information, a spread component of the magnetic flux emitted from the front end portion 10A is received by the write shield layer 30, so that the spread of the magnetic flux is prevented. Since the magnetic flux emitted from the front end portion 10A and returned from the recording medium (used for the recording process) is received by the write shield layer 30, the magnetic flux is circulated between the thin film magnetic head and the recording medium.

At the time of reproduction, when a sense current flows into the MR device 6 in the reproducing head portion 100A, the resistance value of the MR device 6 changes according to a signal magnetic field from the recording medium. Since the resistance change in the MR element 6 is detected as a change in the sense current, the information recorded on the recording medium is magnetically read.

A method of manufacturing the thin film magnetic head will now be described with reference to FIGS. 1A and 1B to FIG. 5. In the following, first, an outline of processes of manufacturing a whole thin film magnetic head will be described. After that, processes of forming a main portion (the magnetic pole layer 10 and its peripheral structure) of the thin film magnetic head will be described in detail. Since the materials, dimensions, and structural features of the series of the components of the thin film magnetic head have been already described in detail, the description will not be repeated.

The thin film magnetic head is manufactured by sequentially forming and stacking the components by mainly using an existing thin film process including a film forming technique such as plating and sputtering, a patterning technique such as photolithography technique, and an etching technique such as dry etching or wet etching. Specifically, first, as shown in FIGS. 1A and 1B, the insulating layer 2 is formed on the substrate 1 and, after that, the lower read shield layer 3, the shield gap film 4 in which the MR device 6 is buried, and the upper shield layer 5 are stacked on the insulating layer 2 in accordance with this order, thereby forming the reproducing head portion 100A. Subsequently, the isolation layer 7 is formed on the reproducing head portion 100A. On the isolation layer 7, the insulating layer 8, the magnetic pole layer 10 whose periphery is buried by the nonmagnetic layer 20 (the insulating layers 9 and 11 and the gap layer 12), the insulating layer 15 in which the thin film coil 14 is buried, and the write shield layer 30 (the TH specifying layer 13 and the yoke layer 16) are stacked in this order, thereby forming the recording head portion 100B. Finally, the overcoat layer 17 is formed on the recording head portion 100B and, after that, the air bearing surface 40 is formed by using machining and polishing process, thereby completing the thin film magnetic head.

At the time of forming the main part of the thin film magnetic head, the insulating layer 8 is formed from alumina by using sputtering. After that, the magnetic pole layer 10 is formed so as to have a tensile stress in the whole, and the insulating layers 9 and 11 (11R and 11L) and the gap layer 12 are formed as the nonmagnetic layer 20 while burying the magnetic pole layer 10 so as to magnetically isolate it from the periphery and so as to have a tensile stress in at least part of it.

Concretely, first, as shown in FIGS. 1A and 1B and FIGS. 3 and 4, the insulating layer 9 is formed on the insulating layer 8 so as to have the stress adjusting function (tensile stress 9T) by using CVD. At the time of forming the insulating layer 9, for example, a material which has a compressive stress when formed by using sputtering and a tensile stress when formed by CVD is contained. Concretely, the insulating layer 9 is formed by containing a nonmagnetic insulating material such as aluminum oxide (AlOx) or aluminum nitride (AlN) so as to have a thickness of about 50 nm to 200 nm.

Subsequently, as shown in FIGS. 1A and 1B to FIG. 4, the magnetic pole layer 10 is pattern-formed so as to have the tensile stress 10T in the whole on the insulating layer 9 by using the plating process. The magnetic pole layer 10 is formed by containing, for example, a material having a positive magnetostriction constant, concretely, an iron-cobalt-base alloy containing iron (Fe) and cobalt (Co) and the thickness becomes about 0.2 μm to 0.3 μm. The magnetic pole layer 10 is formed so as to include, for example, as shown in FIG. 2, the front end portion 10A having the width W1 and the rear end portion 10B coupled to the front end portion 10A and having the width W2 larger than the width W1 (W2>W1).

An example of the detailed procedure of forming the magnetic pole layer 10 is as follows. First, a seed layer (not shown) as an electrode film is formed on the insulating layer 9 by sputtering. As the material of the seed layer, for example, a material similar to that of the magnetic pole layer 10 is used. Subsequently, a photoresist film (not shown) is formed by applying a photoresist on the surface of the seed layer and is patterned by using a photolithography process, thereby forming a photoresist pattern (not shown) in which an opening for forming the magnetic pole layer 10 is provided. The seed layer is used and a plating film is selectively grown in the opening in the photoresist pattern, thereby forming the magnetic pole layer 10. Finally, the photoresist pattern is removed and the unnecessary part in the seed layer is partially etched using the magnetic pole layer 10 by dry etching such as ion milling. As a result, the magnetic pole layer 10 is pattern-formed on the insulating layer 9.

Description of the process of forming the main part of the thin film magnetic head will be continued. After forming the magnetic pole layer 10, as shown in FIGS. 1A and 1B and FIG. 3, the insulating layer 11 (11R and 11L) is formed by sputtering so as to bury the periphery of the magnetic pole layer 10 and to have a compressive stress. For example, the insulating layer 11 is formed so as to cover the magnetic pole layer 10 and the insulating layer 8 in the periphery of the magnetic pole layer 10 and, after that, polished and planarized until the magnetic pole layer 10 is exposed by using a polishing method such as CMP (Chemical Mechanical Polishing), thereby burying the insulating layer 11 around the magnetic pole layer 10.

Finally, as shown in FIGS. 1A and 1B, 3, and 4, the gap layer 12 is formed so as to have a stress adjusting function (tensile stress 12T) in a manner similar to the insulating layer 9 on the planarized surface constructed by the magnetic pole layer 10 and the insulating layer 11 by using CVD. The gap layer 12 is formed by using a material similar to that of the insulating layer 9 so that the thickness becomes about 10 nm to 100 nm. As a result, the insulating layer 9 and the gap layer 12 are formed so as to have the tensile stresses 9T and 12T, respectively, in correspondence with the tensile stress 10T of the magnetic pole layer 10 as shown in FIG. 4. As shown in FIG. 5, the magnetic domain structure of the magnetic pole layer 10 is optimized so that the magnetization component 10X becomes dominant over the magnetization component 10Y and it completes the main part of the thin film magnetic head.

In the thin film magnetic head according to the embodiment and the method of manufacturing the same, when the magnetic pole layer 10 has the tensile stress 10T, the insulating layer 9 under the magnetic pole layer 10 has the tensile stress 9T in correspondence with the tensile stress 10T and the gap layer 12 on the magnetic pole layer 10 has the tensile stress 12T similarly in correspondence with the tensile stress 10T. Consequently, by optimizing the magnetic domain structure of the magnetic pole layer 10, unintended erasure of information can be suppressed at the non-recording time as described below.

Figure 6:
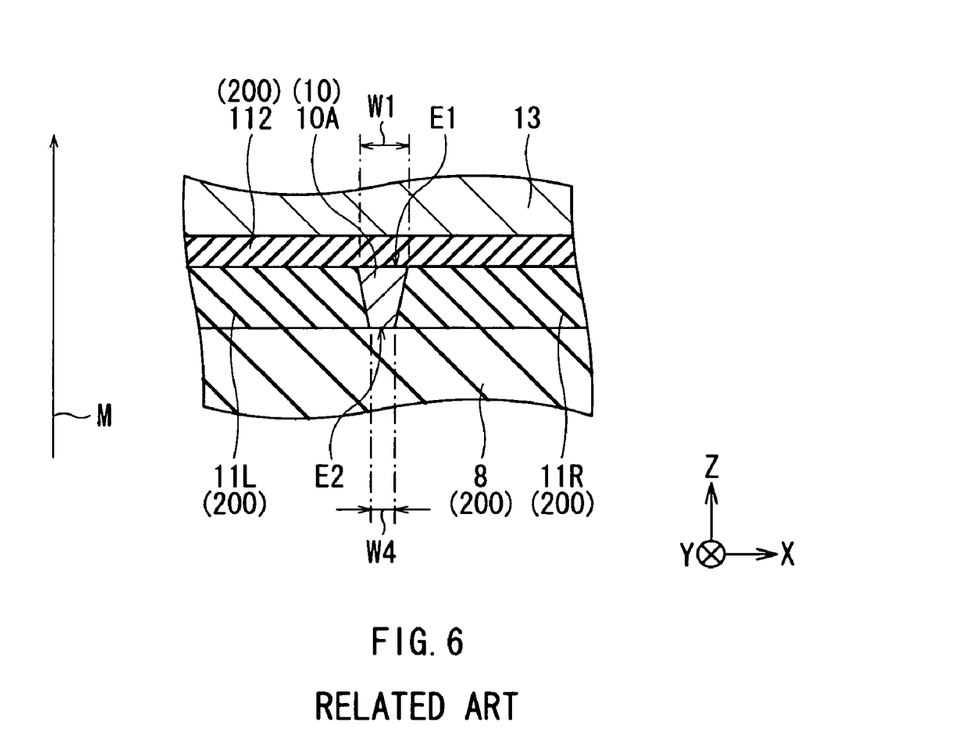
FIG. 6 is an enlarged cross section showing the configuration of a magnetic pole layer and its peripheral structure in a thin film magnetic head as a comparative example of the thin film magnetic head according to the embodiment of the invention.
Figure 7:
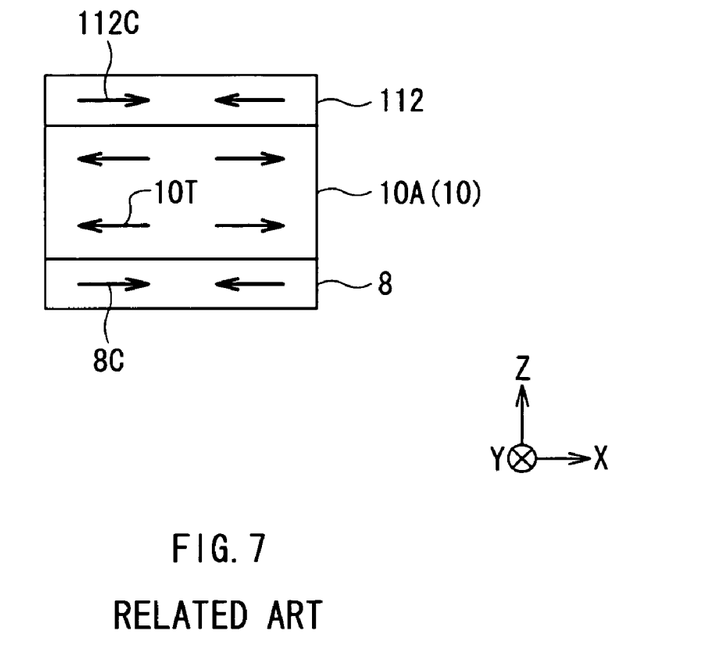
FIG. 7 is a diagram schematically showing a stress state of the magnetic pole layer and its peripheral structure illustrated in FIG. 6.
Figure 8:
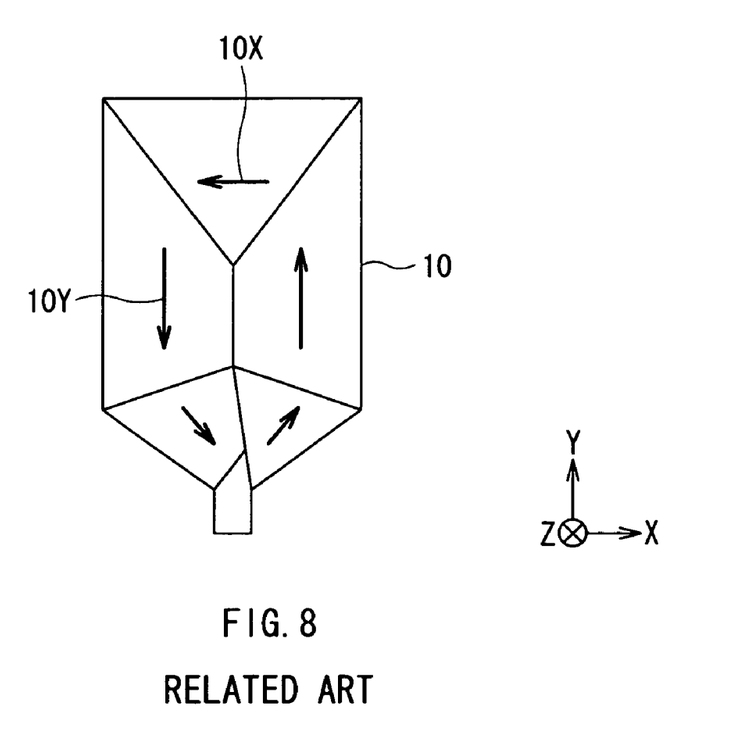
FIG. 8 is a diagram schematically showing a magnetic domain structure of the magnetic pole layer corresponding to the stress state shown in FIG. 7.

FIGS. 6 to 8 illustrate the configuration of a thin film magnetic head as a comparative example of the thin film magnetic head according to the embodiment and show structural characteristics corresponding to FIGS. 3 to 5, respectively. The thin film magnetic head of the comparative example has, for example, as shown in FIG. 6, a configuration similar to that of the thin film magnetic head (refer to FIGS. 1A and 1B to FIG. 5) according to the embodiment except for the point that a nonmagnetic layer 200 (the insulating layers 8 and 11 (11R and 11L) and a gap layer 112) is provided in place of the nonmagnetic layer 20 (the insulating layers 9 and 11 (11R and 11L) and the gap layer 12). Specifically, the thin film magnetic head of the comparative example does not have the insulating layer 9 having the stress adjusting function. In place of the insulating layer 9, the insulating layer 8 having no stress adjusting function is provided adjacent to the magnetic pole layer 10. In place of the gap layer 12 having the stress adjusting function, the thin film magnetic head of the comparative example has the gap layer 112 having no stress adjusting function. As shown in FIG. 7, in the case where the magnetic pole layer 10 has the tensile stress 10T, the insulating layer 8 under the magnetic pole layer 10 has a compression stress 8C and the gap layer 112 on the magnetic pole layer 10 has a compression stress 112C like the insulating layer 8. The insulating layer 8 is formed of, for example, a nonmagnetic insulating material by using sputtering and does not have the stress adjusting function. The gap layer 112 is formed of, for example, a nonmagnetic insulating material by using sputtering and has only the function of constructing a magnetic gap but does not have the stress adjusting function.

In the thin film magnetic head of the comparative example (refer to FIGS. 6 to 8), in the case where the magnetic pole layer 10 has the tensile stress 10T, the insulating layer 8 under the magnetic pole layer 10 has the compression stress 8C and the gap layer 112 on the magnetic pole layer 10 has the compression stress 112C, so that the tensile stress 10T is lessened due to the mechanical influence based on the compressive stresses 8C and 112C. In this case, for example, as shown in FIG. 8, the proportion of the magnetization component 10Y becomes larger than that of the magnetization component 10X in the magnetic domain structure of the magnetic pole layer 10. That is, the magnetization component 10Y parallel to the magnetic flux emitting direction (Y-axis direction) at the time of recording becomes dominant. Due to the magnetic domain structure in which the magnetization component 10Y is dominant, by the influence of the magnetoelastic effect immediately after recording, a magnetic flux remained in the magnetic pole layer 10 tends to leak to the outside. Consequently, due to the magnetic flux leaked from the magnetic pole layer 10, information recorded on a recording medium tends to be unintentionally erased.

In contrast, in the thin film magnetic head according to the embodiment (refer to FIGS. 3 to 5), in the case where the magnetic pole layer 10 has the tensile stress 10T, the insulating layer 9 under the magnetic pole layer 10 has the tensile stress 9T and the gap layer 12 on the magnetic pole layer 10 has the tensile stress 12T, so that the tensile stress 10T is maintained by the mechanical influence based on the tensile stresses 9T and 12T. In this case, for example, as shown in FIG. 5, the proportion of the magnetization component 10X is larger than that of the magnetization component 10Y in the magnetic domain structure of the magnetic pole layer 10. That is, the magnetization component 10X orthogonal to the magnetic flux emitting direction (Y-axis direction) at the time of recording becomes dominant. As a result, on the basis of the magnetic domain structure in which the magnetization component 10X is dominant, the magnetic domain structure of the magnetic pole layer 10 is optimized so that leakage of the magnetic flux remained in the magnetic pole layer 10 to the outside due to the influence of the magnetoelastic effect immediately after recording is suppressed, and unintended erasure of information recorded on a recording medium is suppressed. Therefore, by optimizing the magnetic domain structure of the magnetic pole layer 10, unintended erasure of information can be suppressed at the non-recording time.

The principle of optimizing the magnetic domain structure of the magnetic pole layer 10 in the embodiment will be described in detail as follows.

Specifically, in the case of using a magnetic material having a positive magnetostriction constant as the material of the magnetic pole layer 10, the magnetic pole layer 10 has a tensile stress. In this case, as the relation between the stress state of the magnetic pole layer 10 and the magnetic domain structure, a magnetic field H induced on the basis of the stress in the magnetic pole layer 10 is expressed as $H = 3\lambda(\sigma/M)$ where $\lambda$ denotes magnetostriction constant, $\sigma$ denotes stress, and M indicates magnetization. When a tensile stress is given in the direction parallel to the air bearing surface 40, the axis of easy magnetization of the magnetic pole layer 10 coincides with the direction of the tensile stress. Considering that the saturated magnetic flux density becomes higher in case of positive magnetostriction constant, it is concluded that the tensile stress is preferable as the stress state of the magnetic pole layer 10.

In this case, for example, when an iron-cobalt-base alloy is used as the material of the magnetic pole layer 10 and the saturated magnetic flux density of the iron-cobalt-base alloy is set to 2.2 T (tesla) or higher, the magnetostriction constant $\lambda$ of the magnetic pole layer 10 becomes $20 \times 10^{-6}$ or higher and the tensile stress of 400 MPa or higher occurs as a stress. On the other hand, for example, when an aluminum oxide is used as the material of the nonmagnetic layer 20 surrounding the magnetic pole layer 10 to form the nonmagnetic layer 20 by sputtering, a compressive stress of about 100 MPa or less occurs as a stress. Specifically, the Young's modulus and the Poisson's ratio of the iron-cobalt-base alloy are 121 GPa and 0.25, respectively, and the Young's modulus and the Poisson's ratio of the aluminum oxide are 150 GPa and 0.3, respectively. Therefore, the stress occurring in the nonmagnetic layer 20 becomes a stress whose direction is opposite to that of the stress (tensile stress) which occurs in the magnetic pole layer 10, that is, a compressive stress.

With respect to the point, in the embodiment, by forming the nonmagnetic layer 20 (in this case, the insulating layer 9 and the gap layer 12) of an aluminum oxide by using CVD, different from the case of forming a film of an aluminum oxide by using sputtering, the tensile stress of about 200 MPa to 300 MPa can be generated in the nonmagnetic layer 20. Based on the fact that the tensile stress of the magnetic pole layer 10 is maintained by the mechanical influence based on the tensile stress of the nonmagnetic layer 20, the magnetic domain structure of the magnetic pole layer 10 is optimized so that leakage of the magnetic flux from the magnetic pole layer 10 to the outside at the non-recording time is suppressed. Based on this point, it is confirmed that the "stress adjusting function" in the embodiment is a function of generating a tensile stress in at least part of the nonmagnetic layer 20 so that when the magnetic pole layer 10 has the tensile stress, the tensile stress of the magnetic pole layer 10 can be maintained as much as possible.

In addition, in the embodiment, the thin insulating layer 9 having a thickness of about 50 nm to 200 nm under the magnetic pole layer 10 and the thin gap layer 12 having a thickness of about 10 nm to 100 nm on the magnetic pole layer 10 have the stress adjusting function. Consequently, the tensile stresses (9T and 12T) of the insulating layer 9 and the gap layer 12 can be controlled with high precision for the following reason. In the case of forming the insulating layer 9 and the gap layer 12 by using the nonmagnetic insulating material so as to have a small thickness of about 200 nm or less by CVD, the value of a stress remaining in each of the insulating layer 9 and the gap layer 12 can be easily controlled with high precision on the basis of the substantial process characteristics of the CVD.

Figure 9:
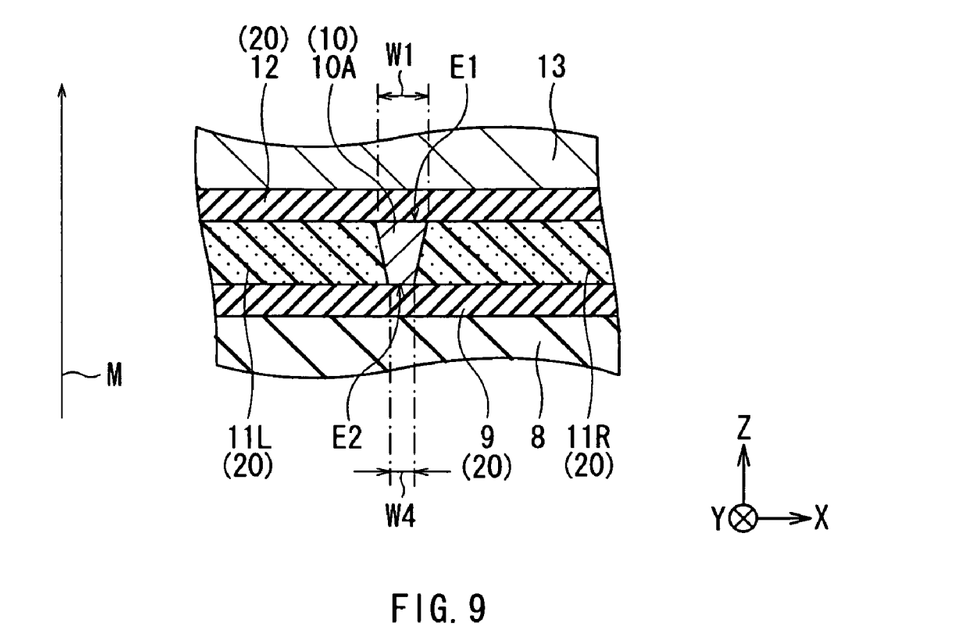
FIG. 9 is a cross section showing a modification of the configuration of the thin film magnetic head according to the embodiment of the invention.
Figure 10:
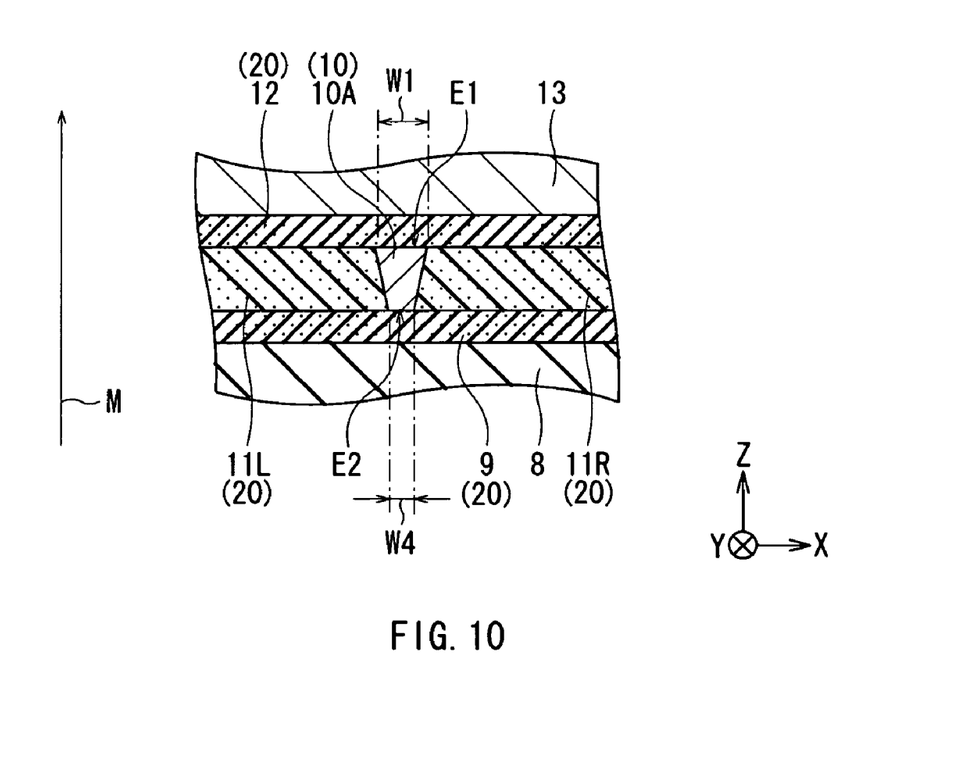
FIG. 10 is a cross section showing another modification of the configuration of the thin film magnetic head according to the embodiment of the invention.

In the embodiment, as shown in FIG. 3, out of the insulating layers 9 and 11 (11R and 11L) and the gap layer 12 constructing the nonmagnetic layer 20, both the insulating layer 9 under the magnetic pole layer 10 and the gap layer 12 on the magnetic pole layer 10 have the stress adjusting function. The invention is not always limited to the embodiment. For example, as shown in FIG. 9, in place of the insulating layer 9 and the gap layer 12, both of the insulating layers 11R and 11L on the right and left sides of the magnetic pole layer 10 may have the stress adjusting function. Alternately, as shown in FIG. 10, all of the insulating layers 9, 11R, and 11L and the gap layer 12 may have the stress adjusting function. It means that the layers are formed by using the nonmagnetic insulating material by CVD so as to have a tensile stress. In this case as well, the magnetic domain structure is optimized by maintaining the tensile stress 10T of the magnetic pole layer 10, so that effects similar to those of the embodiment can be obtained. In FIG. 9, to clarify that only the insulating layers 11R and 11L have the stress adjusting function, the insulating layers 11R and 11L are hatched. On the other hand, in FIG. 10, to clarify that all of the insulating layers 9, 11R, and 11L and the gap layer 12 have the stress adjusting function (tensile stress), the insulating layers 9, 11R, and 11L and the gap layer 12 are hatched.

Figure 11A:
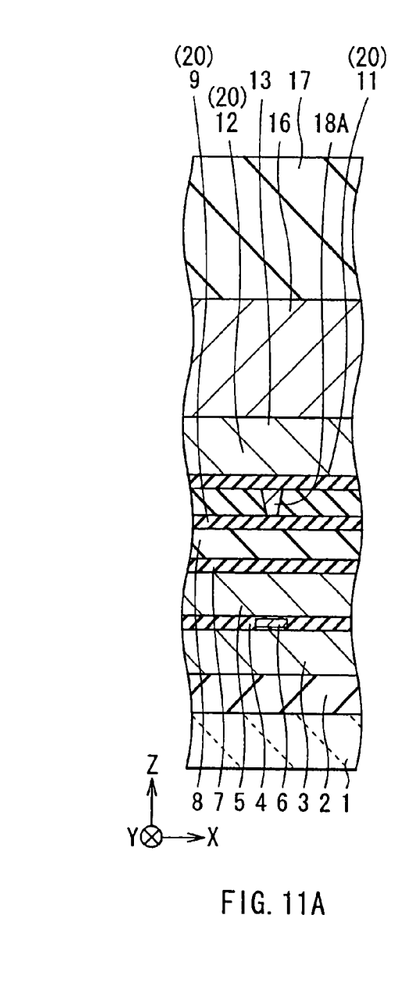
FIGS. 11A and 11B are cross sections showing further another modification of the configuration of the thin film magnetic head according to the embodiment of the invention.
Figure 11B:
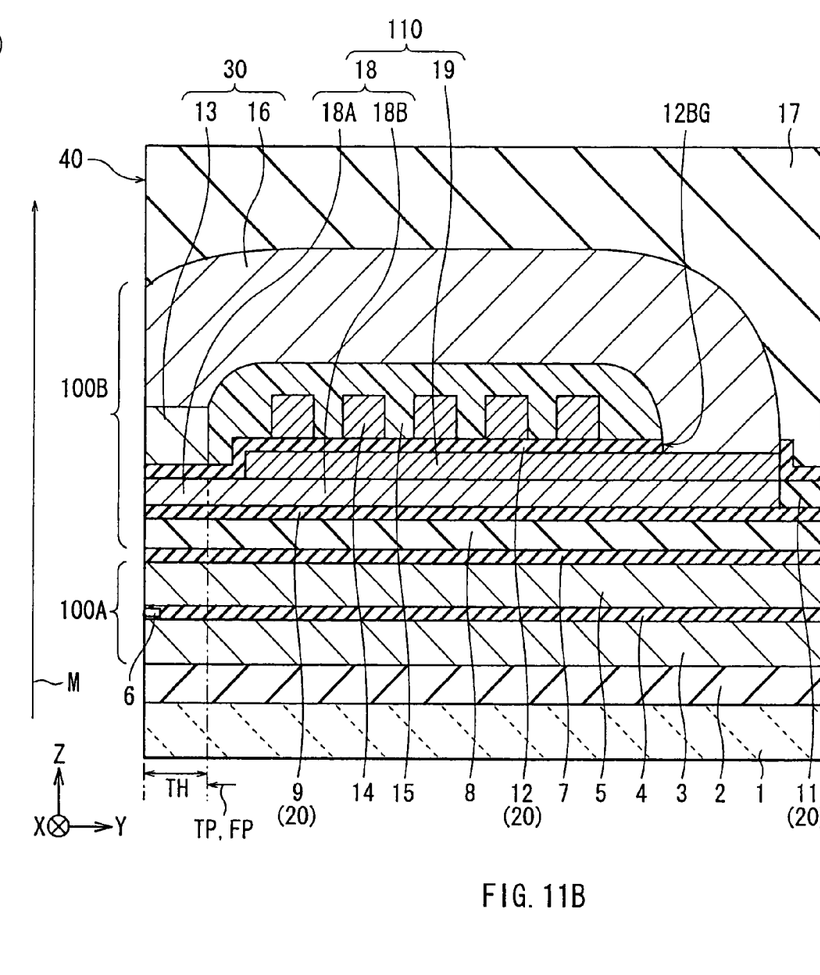

Although the magnetic pole layer 10 having the single layer structure is provided as shown in FIGS. 1A and 1B in the embodiment, the invention is not always limited to the configuration. For example, as shown in FIGS. 11A and 11B, a magnetic pole layer 110 having a stacking structure may be provided in place of the magnetic pole layer 10 having the single layer structure. The magnetic pole layer 110 has a two-layer structure in which a main magnetic pole layer 18 positioned on the leading side and an auxiliary magnetic pole layer 19 positioned on the trailing side are stacked. The main magnetic pole layer 18 has a structure corresponding to, for example, the magnetic pole layer 10, to be specific, it includes a front end portion 18A corresponding to the front end portion 10A and a rear end portion 18B corresponding to the rear end portion 10B. The main magnetic pole layer 18 functions as a main magnetic flux emitting part and extends rearward from the air bearing surface 40 as described above. On the other hand, the auxiliary magnetic pole layer 19 functions as a magnetic flux containing part which assists the magnetic pole layer 18 and extends rearward from a position receded from the air bearing surface 40. The auxiliary magnetic pole layer 19 is coupled to the main magnetic pole layer 18 on the leading side and is coupled to the write shield layer 30 via the back gap 12BG on the trailing side. In the thin film magnetic head having the magnetic pole layer 110, when a magnetic flux is generated in the thin film coil 14, the magnetic flux is directly supplied to the main magnetic pole layer 18 and is also contained by the auxiliary magnetic pole layer 19 and indirectly supplied (additionally supplied) to the main magnetic pole layer 18. As a result, the amount of the magnetic flux finally supplied to the front end portion 18A in the main magnetic pole layer 18 increases, so that the intensity of the perpendicular magnetic field can be increased. The other configuration of the thin film magnetic head shown in FIGS. 11A and 11B is similar to that shown in FIGS. 1A and 1B.

The thin film magnetic head according to the embodiment of the invention and the method of manufacturing the same have been described above.

Figure 12:
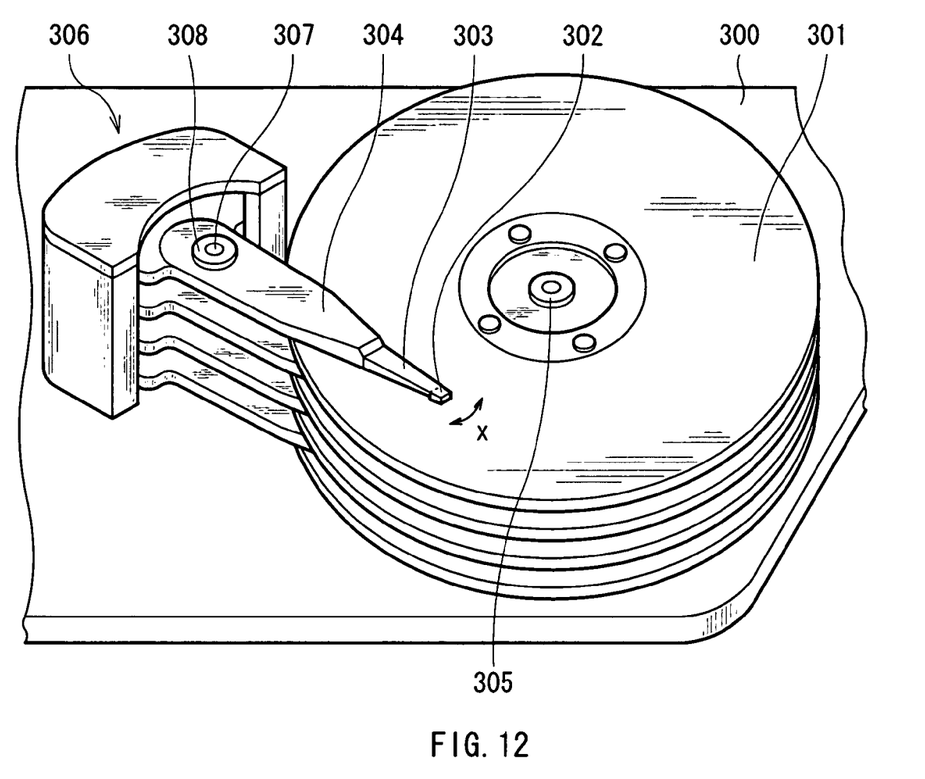
FIG. 12 is a perspective view showing the configuration of a magnetic recording apparatus on which the thin film magnetic head of the invention is mounted.
Figure 13:
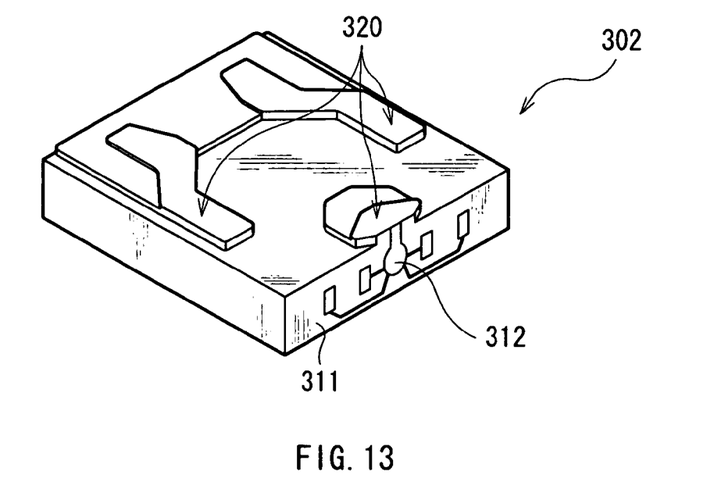
FIG. 13 is an enlarged perspective view showing the configuration of a main part of the magnetic recording apparatus shown in FIG. 12.

Next, with reference to FIGS. 12 and 13, the configuration of a magnetic recording apparatus on which the thin film magnetic head of the invention is mounted will be described. FIGS. 12 and 13 show a configuration of the magnetic recording apparatus. FIG. 12 is a perspective view showing the configuration of the whole magnetic recording apparatus. FIG. 13 is an enlarged perspective view of a main part.

The magnetic recording apparatus shown in FIGS. 12 and 13 includes the thin film magnetic head described in the foregoing embodiment and is, for example, a hard disk drive. The magnetic recording apparatus has, as shown in FIG. 12, for example, in a casing 300, a plurality of magnetic disks (such as hard disks) 301 as recording media on which information is to be magnetically recorded, a plurality of suspensions 303 disposed in correspondence with the magnetic disks 301 and each supporting a magnetic head slider 302 at its one end, and a plurality of arms 304 supporting the other ends of the suspensions 303. The magnetic disk 301 is rotatable around a spindle motor 305 fixed to the casing 300 as a center. The arms 304 are connected to a driving unit 306 as a power source and are swingable via a bearing 308 around a fixed shaft 307 fixed to the casing 300 as a center. The driving unit 306 includes a driving source such as a voice coil motor. The magnetic recording apparatus is a model in which, for example, the plurality of arms 304 can integrally swing around the fixed shaft 307 as a center. FIG. 12 shows the casing 300 which is partially cut away so that the internal structure of the magnetic recording apparatus can be seen well.

The magnetic head slider 302 has a configuration such that, as shown in FIG. 13, a thin film magnetic head 312 executing both of recording and reproducing processes is attached to one of the faces of a substrate 311 having an almost rectangular parallelepiped shape and made of a nonmagnetic insulating material such as altic. The substrate 311 has one face (air bearing surface 320) including projections and depressions to decrease air resistance which occurs when the arm 304 swings. The thin film magnetic head 312 is attached to another face (the right front-side face in FIG. 13) orthogonal to the air bearing surface 320. The thin film magnetic head 312 has the configuration described in the foregoing embodiment. When the magnetic disk 301 rotates at the time of recording or reproducing information, the magnetic head slider 302 floats from the recording surface of the magnetic disk 301 by using an air current generated between the recording surface (the surface facing the magnetic head slider 302) of the magnetic disk 301 and the air bearing surface 320. FIG. 13 shows the upside down state of FIG. 12 so that the structure on the air bearing surface 320 side of the head slider 302 can be seen well.

In the magnetic recording apparatus, at the time of recording or reproducing information, by swing of the arm 304, the magnetic head slider 302 moves to a predetermined region (recording region) in the magnetic disk 301. When current is passed to the thin film magnetic head 312 in a state where the thin film magnetic head 312 faces the magnetic disk 301, by the operation based on the operation principle described in the foregoing embodiment, the thin film magnetic head 312 performs a recording or reproducing process on the magnetic disk 301.

Since the magnetic recording apparatus has the thin film magnetic head 312 of the invention, the magnetic domain structure in the magnetic pole layer 10 (refer to FIGS. 1A and 1B to FIG. 5) in the thin film magnetic head 312 is optimized. Therefore, unintended erasure of information at the non-recording time can be suppressed.

The other configuration, operation, action, effects, and modification of the thin film magnetic head 312 mounted on the magnetic recording apparatus are similar to those of the foregoing embodiment, so that their description will not be repeated.

Although the invention has been described by the embodiment, the invention is not limited to the foregoing embodiment but can be variously modified. Concretely, for example, in the embodiment, the case of applying the invention to a shield-type head has been described. The invention is not limited to the case but may be applied to a head of a single magnetic pole type. Although the case of applying the invention to a composite thin film magnetic head has been described in the foregoing embodiment, the invention is not limited to the case. The invention can be also applied to, for example, a thin film magnetic head dedicated to recording having an inductive magnetic transducer for writing and a thin film magnetic head having an inductive magnetic transducer for recording and reproducing. Obviously, the invention can be also applied to a thin film magnetic head having a structure in which a device for writing and a device for reading are stacked in the order opposite to that of the thin film magnetic head of the embodiment.

Although the case of applying the invention to the thin film magnetic head of the perpendicular recording method has been described in the foregoing embodiment, the invention is not always limited to the case but can be also applied to a thin film magnetic head of a longitudinal recording method.

The thin film magnetic head and the method of manufacturing the same according to the invention can be applied to a magnetic recording apparatus such as a hard disk drive for magnetically recording information onto a hard disk.

Obviously many modifications and variations of the present invention are possible in the light of the above teachings. It is therefore to be understood that within the scope of the appended claims, the invention may be practiced otherwise than as specifically described.

What is claimed is:

1. A perpendicular magnetic recording head comprising:
a thin film coil for generating a magnetic flux;
a magnetic pole layer extending rearward from a recording-medium-facing surface which faces a recording medium traveling in a medium travel direction, emitting the magnetic flux generated by the thin film coil toward the recording medium, and having a tensile stress in the whole; and
a nonmagnetic layer which buries the magnetic pole layer, thereby magnetically isolating the magnetic pole layer, and having a tensile stress at least in part of the nonmagnetic layer, wherein
the magnetic pole layer specifies a recording track width of the recording medium,
the nonmagnetic layer includes a first nonmagnetic layer part which is adjacent to the magnetic pole layer in a first direction in the medium travel direction, a second nonmagnetic layer part which is adjacent to the magnetic pole layer in a second direction opposite to the first direction, a third nonmagnetic layer part adjacent to the magnetic pole layer in a third direction in the recording track width direction, and a fourth nonmagnetic layer part adjacent to the magnetic pole layer in a fourth direction opposite to the third direction, and
only the first and second nonmagnetic layer parts have a tensile stress.

2. A perpendicular magnetic recording head comprising:
a thin film coil for generating a magnetic flux;
a magnetic pole layer extending rearward from a recording-medium-facing surface which faces a recording medium traveling in a medium travel direction, emitting the magnetic flux generated by the thin film coil toward the recording medium, and having a tensile stress in the whole; and
a nonmagnetic layer which buries the magnetic pole layer, thereby magnetically isolating the magnetic pole layer, and having a tensile stress at least in part of the nonmagnetic layer, wherein
the magnetic pole layer specifies a recording track width of the recording medium,
the nonmagnetic layer includes a first nonmagnetic layer part which is adjacent to the magnetic pole layer in a first direction in the medium travel direction, a second nonmagnetic layer part which is adjacent to the magnetic pole layer in a second direction opposite to the first direction, a third nonmagnetic layer part adjacent to the magnetic pole layer in a third direction in the recording track width direction, and a fourth nonmagnetic layer part adjacent to the magnetic pole layer in a fourth direction opposite to the third direction, and
only the third and fourth nonmagnetic layer parts have a tensile stress.

3. A magnetic recording apparatus on which a recording medium and a perpendicular magnetic recording head for performing a magnetic process on the recording medium are mounted,
wherein the perpendicular magnetic recording head comprises:
a thin film coil for generating a magnetic flux;
a magnetic pole layer extending rearward from a recording-medium-facing surface which faces a recording medium traveling in a medium travel direction, emitting the magnetic flux generated by the thin film coil toward the recording medium, and having a tensile stress in the whole; and a nonmagnetic layer which buries the magnetic pole layer, thereby magnetically isolating the magnetic pole layer, and having a tensile stress at least in part of the nonmagnetic layer, wherein the magnetic pole layer specifies a recording track width of the recording medium, the nonmagnetic layer includes a first nonmagnetic layer part which is adjacent to the magnetic pole layer in a first direction in the medium travel direction, a second nonmagnetic layer part which is adjacent to the magnetic pole layer in a second direction opposite to the first direction, a third nonmagnetic layer part adjacent to the magnetic pole layer in a third direction in the recording track width direction, and a fourth nonmagnetic layer part adjacent to the magnetic pole layer in a fourth direction opposite to the third direction, and only the first and second nonmagnetic layer parts have a tensile stress.

4. A magnetic recording apparatus on which a recording medium and a perpendicular magnetic recording head for performing a magnetic process on the recording medium are mounted, wherein the perpendicular magnetic recording head comprises:

a thin film coil for generating a magnetic flux;

a magnetic pole layer extending rearward from a recording-medium-facing surface which faces a recording medium traveling in a medium travel direction, emitting the magnetic flux generated by the thin film coil toward the recording medium, and having a tensile stress in the whole; and a nonmagnetic layer which buries the magnetic pole layer, thereby magnetically isolating the magnetic pole layer, and having a tensile stress at least in part of the nonmagnetic layer, wherein the magnetic pole layer specifies a recording track width of the recording medium, the nonmagnetic layer includes a first nonmagnetic layer part which is adjacent to the magnetic pole layer in a first direction in the medium travel direction, a second nonmagnetic layer part which is adjacent to the magnetic pole layer in a second direction opposite to the first direction, a third nonmagnetic layer part adjacent to the magnetic pole layer in a third direction in the recording track width direction, and a fourth nonmagnetic layer part adjacent to the magnetic pole layer in a fourth direction opposite to the third direction, and only the third and fourth nonmagnetic layer parts have a tensile stress.

\* \* \* \* \*